(12) United States Patent
Gondhi et al.

(10) Patent No.: US 9,956,903 B2
(45) Date of Patent: May 1, 2018

(54) VEHICLE REAR ILLUMINATION SYSTEM

(71) Applicant: FORD GLOBAL TECHNOLOGIES, LLC, Dearborn, MI (US)

(72) Inventors: Srihari Prasad Gondhi, Novi, MI (US); Sleiman N. Abdelnour, Macomb, MI (US); Udayakumar Ramasami, Novi, MI (US); Stephen Kenneth Helwig, Farmington Hills, MI (US); Li Yan, Troy, MI (US)

(73) Assignee: FORD GLOBAL TECHNOLOGIES LLC, Dearborn, MI (US)

( * ) Notice: Subject to any disclaimer, the term of this patent is extended or adjusted under 35 U.S.C. 154(b) by 0 days. days.

(21) Appl. No.: 14/886,439

(22) Filed: Oct. 19, 2015

(65) Prior Publication Data

US 2017/0106784 A1  Apr. 20, 2017

(51) Int. Cl.
*H05B 37/02*  (2006.01)
*B60Q 1/24*  (2006.01)
*B60Q 1/22*  (2006.01)

(52) U.S. Cl.
CPC  *B60Q 1/24* (2013.01); *B60Q 1/22* (2013.01)

(58) Field of Classification Search
CPC . B60Q 1/2607; B60Q 1/0017; H05B 37/0218
USPC ......................................................... 315/77
See application file for complete search history.

(56) References Cited

U.S. PATENT DOCUMENTS

| | | | |
|---|---|---|---|
| 3,868,629 A * | 2/1975 | Caine | B60Q 1/525 340/435 |
| 6,102,559 A * | 8/2000 | Nold | B60Q 1/0011 340/468 |
| 7,498,686 B2 | 3/2009 | Capenos | |
| 8,061,878 B1 | 11/2011 | Kuntz | |
| 8,436,747 B2 | 5/2013 | Schoepp | |
| 8,854,201 B1 | 10/2014 | Hertz et al. | |
| 2006/0220825 A1* | 10/2006 | Mertens | B60Q 1/20 340/479 |

(Continued)

FOREIGN PATENT DOCUMENTS

CN  103851506 A  6/2014

OTHER PUBLICATIONS

English machine translation of CN103851506A.
"White Night Rear Lighting Systems", www.whitenight.com, Copyright 2014-2015 for White Night and SSIS.

*Primary Examiner* — Don Le
(74) *Attorney, Agent, or Firm* — Jason Rogers; King & Schickli PLLC

(57) ABSTRACT

A vehicle spot or floodlight system includes a vehicle rear-mounted light source such as a backup light array configured to emit light at a first intensity and at another intensity that is different from the first intensity. Emission of light at the another intensity is caused by an actuator operatively associated with the rear-mounted light source. A controller selectively allows the actuator to cause the emission at the another intensity. The controller allows the actuator to cause the emission of light at the another intensity only on receiving a signal indicating that the vehicle transmission is in a park or on receiving a signal indicating that the vehicle ignition is set on run, accessory, or off. The controller resets the actuator to off after a predefined time period when the ignition system is set on accessory or off, or when the transmission is placed in drive.

15 Claims, 3 Drawing Sheets

(56) References Cited

U.S. PATENT DOCUMENTS

2008/0285292 A1* 11/2008 Medina ................ B60Q 1/2607
362/473
2015/0345938 A1* 12/2015 Salter ................ H05B 37/0218
116/28 R
2015/0345939 A1* 12/2015 Salter ................ H05B 37/0218
356/138

* cited by examiner

VEHICLE REAR ILLUMINATION SYSTEM

TECHNICAL FIELD

This disclosure relates generally to vehicle illumination. More particularly, the disclosure relates to a lighting system architecture utilizing existing vehicle illumination arrays as rear spot or floodlights for illumination at need of an area behind a vehicle.

BACKGROUND

Modern motor vehicles include a variety of illumination systems, such as headlamps, running lights, brake lights, backup lights, fog lights and others. Other than the vehicle headlamps and fog lights, most illumination associated with a vehicle is intended to increase visibility of the vehicle to others, rather than for improving the ability of a vehicle operator or passenger to better see fore and/or aft of the vehicle.

There are situations where additional flood or spot lighting is advantageous. For example, many vehicles including trucks, sport-utility vehicles (SUVs), crossover utility vehicles (CUVs), and others are used to tow or haul items such as trailers, boats, etc. On arrival at a destination, the vehicle user often will want to unhook and/or inspect the towed item. Alternatively, the user may need to hook up the towed item prior to a trip. Still more, the vehicle user may want to perform tasks near the vehicle, such as pitching a tent, unloading items from the vehicle, and others. These tasks are made more difficult due to poor visibility at dawn, dusk, night-time, or in poorly lit areas. The user's only solution may be to carry extra lighting such as handheld flashlights, spotlights, work lights, or other light sources, but this is often not convenient.

Some level of illumination can be achieved with existing vehicle rear-mounted lighting arrays such as brake lights and backup lights. However, use of such lights requires user interaction, for example placing the vehicle in reverse to actuate the backup lights, depressing the brake pedal to actuate the brake lights, etc. Moreover, rear-mounted lighting arrays for a vehicle typically emit only sufficient light to serve as a warning, for example brake lights to alert others that the vehicle is braking, backup lights to alert others that the vehicle has been placed in reverse, etc. These lighting arrays do not emit sufficient light to properly illuminate the area behind the vehicle for such tasks as hooking/unhooking/inspecting towed items.

To solve this and other problems, the present disclosure relates at a high level to a vehicle lighting system architecture for utilizing a backup light system as a rear spot or floodlight. Advantageously, the described system can be used as conventional backup lighting, but at need increases the intensity of the backup lights to project desired spot or floodlighting over an area to the rear of the vehicle.

SUMMARY

In accordance with the purposes and benefits described herein, in one aspect the present disclosure relates to a vehicle spot or floodlight system including a vehicle rear-mounted light source configured to emit light at a first intensity and at another intensity that is different from the first intensity. An actuator is operatively associated with the rear-mounted light source to cause emission of light at the another intensity. Further, a controller is provided, configured to selectively allow the actuator to cause the emission at the another intensity. In embodiments, the rear-mounted light source comprises a vehicle backup light array disposed whereby the another intensity illuminates a predefined area disposed behind the vehicle. In embodiments, the actuator is a dedicated switch associated with one or more of the vehicle, a vehicle key, or a vehicle key fob. The controller may be one or more of a microprocessor, a vehicle body control module (BCM), and a pulse-width modulator (PWM).

In embodiments, the controller is configured to allow the actuator to cause the emission of light at the another intensity only on receiving a signal indicating that a transmission of the vehicle is placed in a park configuration. The controller may be further configured to allow the actuator to cause the emission of light at the another intensity only on receiving a signal indicating that an ignition system of the vehicle is placed in a run configuration, an accessory configuration, or an off configuration. In embodiments, the controller is configured to reset the actuator to an off status after a predefined time period on receiving a signal indicating that the ignition system is placed in the accessory configuration or the off configuration. In embodiments, the controller is configured to reset the actuator to the off status on receiving a signal indicating that the transmission is placed in a drive configuration.

In another aspect, the present disclosure provides methods for providing a vehicle spot or floodlight utilizing the system described above.

In the following description, there are shown and described embodiments of the disclosed vehicle rear illumination system. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed vehicle rear illumination system, and together with the description serve to explain certain principles thereof. In the drawings.

Reference will now be made in detail to embodiments of the disclosed vehicle rear illumination system, examples of which are illustrated in the accompanying drawing figures wherein like reference numerals identify like features.

DETAILED DESCRIPTION

Figure 1:
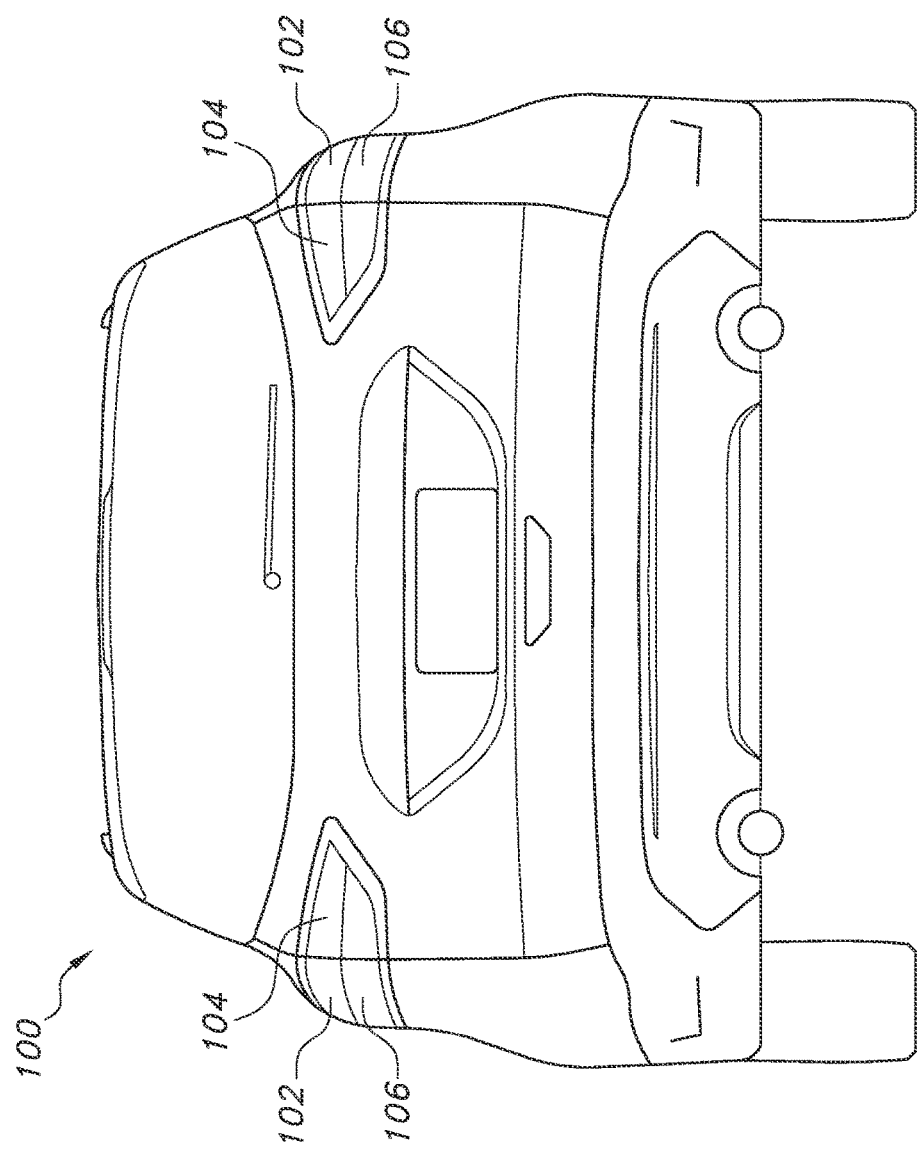
FIG. 1 depicts a rear portion of a prior art vehicle including lighting arrays.

With reference to FIG. 1, there is shown a rear portion of a vehicle 100. As summarized above, typically various lighting arrays are provided, including at least brake lights 102, running lights 104, and backup lights 106. Conventional backup lights 106 emit light of a particular color (most often white) in order to alert others such as pedestrians that the transmission of the vehicle 100 has been placed in reverse and is about to back up.

Figure 2:
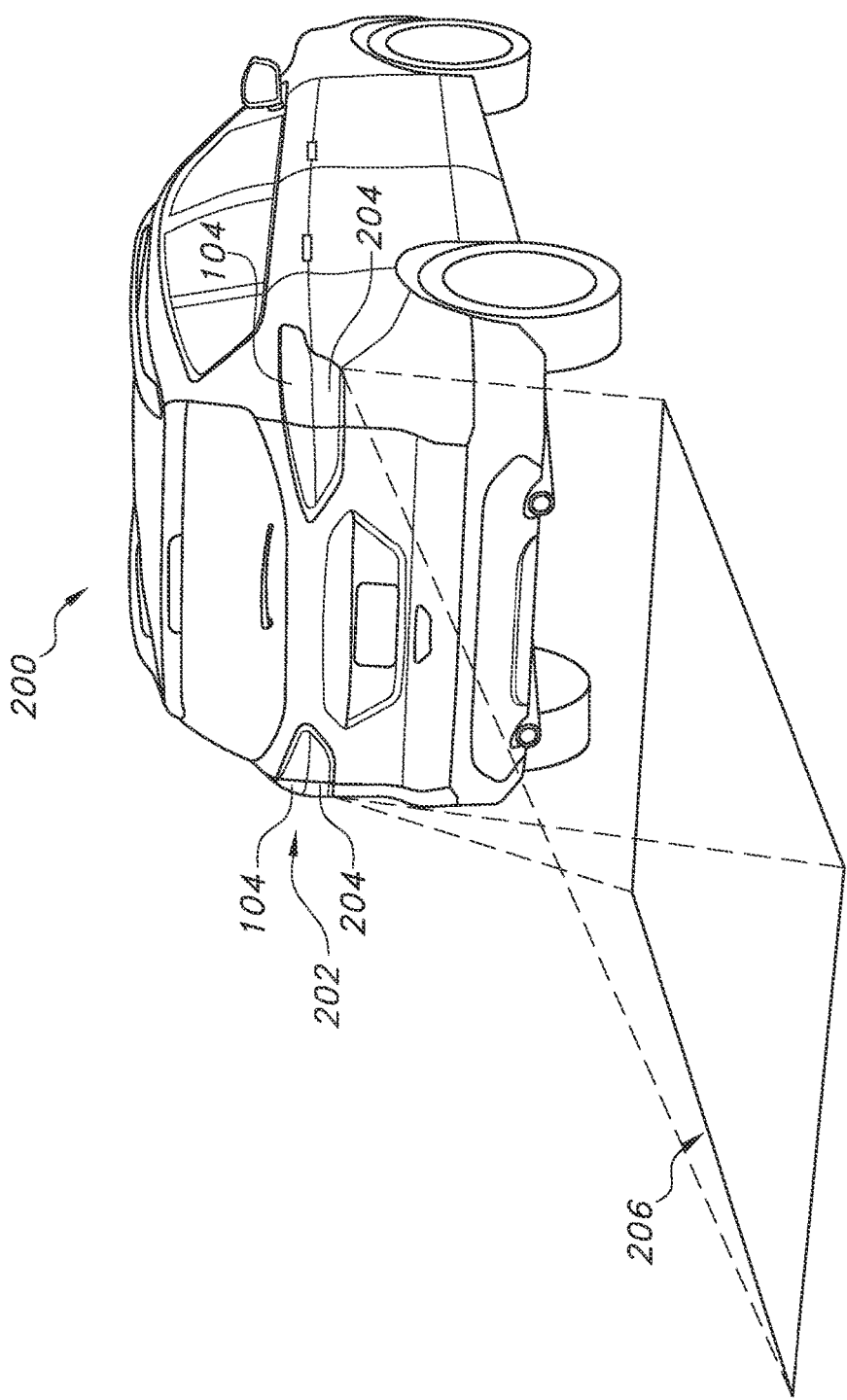
FIG. 2 illustrates a vehicle according to the present disclosure including a backup lighting array configured for use as a rear spot or floodlight.

FIG. 2 illustrates a vehicle 200 including a rear-mounted spot or floodlight system 202. As depicted, the rear-mounted spot or floodlight system comprises rear-mounted light sources 204 disposed to emit light in a vehicle-rear direction. In the depicted embodiment, the rear-mounted lamps 204 are placed in the sockets where conventional backup lights are ordinarily disposed.

In an embodiment, a four light-emitting diode (LED) array is used to provide each rear-mounted light source 204. Each LED array is configured to emit light at two intensity setting. At a first setting, each LED array emits light at a first intensity to meet typical requirements for backup lights, for example to meet Federal Motor Vehicle Safety Standard (FMVSS) 108 requirements, System Design Specification (SDS) requirements, and others.

At a second setting, each rear-mounted light source 204 emits light at a second intensity that is greater than the first intensity, sufficient to illuminate illuminates a predefined area 206 disposed behind the vehicle 200. It will be appreciated that any suitable predefined area 206 size may be illuminated according to the selected LED intensities, and the skilled artisan is fully capable of selecting particular LED intensities in order to illuminate a desired area 206. By this design, a convenient vehicle rear-mounted spot or floodlight is provided, allowing a user to illuminate an area behind the vehicle for improving visibility for a number of tasks as summarized above, such as hooking/unhooking a trailer, removing items from the vehicle, etc.

Figure 3:
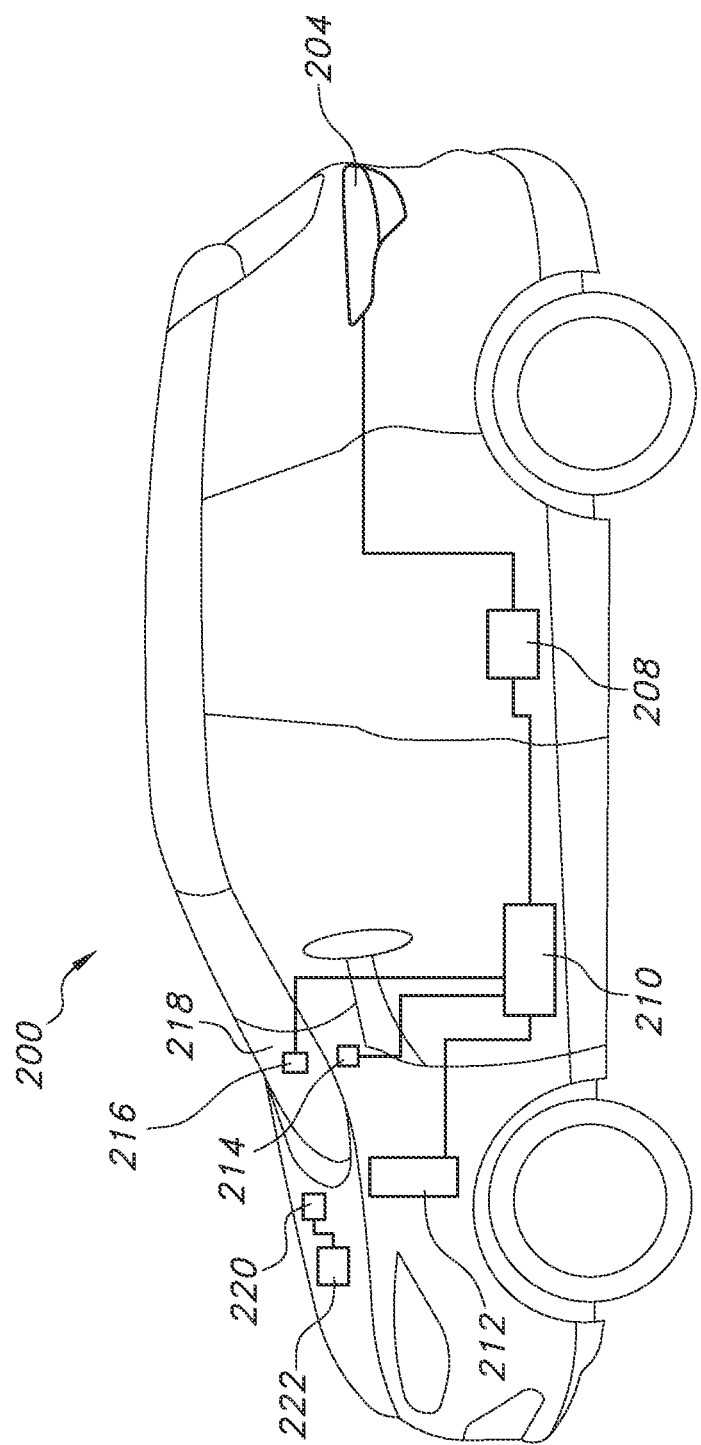
FIG. 3 shows a controller configuration for the backup lighting array of FIG. 2.

A number of ways of causing an LED to emit light at a greater or lesser intensity are known, and are contemplated for use herein. In one embodiment (see FIG. 3), the rear-mounted light source 204 are operatively associated with a pulse-width modulator (PWM) 208 under the control of a controller, for example the vehicle body control module (BCM) 210. As is known, a PWM simulates a varying static voltage, whereby by increasing a voltage supplied to the rear-mounted light sources 204 the intensity of light emitted thereby is increased to a desired level.

As will be appreciated, it would be unnecessary and potentially disadvantageous to have the rear-mounted light sources 204 emitting light at the second intensity in certain situations, such as when the vehicle is traveling along a roadway. To avoid this situation, under certain conditions the rear-mounted light sources 204 will not emit light at the second, higher intensity. Under other conditions, the rear-mounted light sources 204 will, after a predetermined time period, cease to emit light at the second, higher intensity.

This is illustrated in Table 1, being a representative example of an operating or look-up table such as for the BCM 210 to control intensity of the rear-mounted light sources 204 by PWM 208. As shown therein and with reference also to FIG. 3, the BCM 210 is operatively connected also to at least a transmission 212 and an ignition system 214 of the vehicle 200. In the depicted embodiment, a dedicated switch 216 for actuating the rear-mounted light sources 204 at the second, higher intensity is provided. The switch 216 is also operatively linked to the BCM 210. The rear-mounted light sources 204 are caused to emit light at the second, higher intensity only by actuation of switch 216, i.e. by placing switch 216 in an "on" setting. As will be appreciated, switch 216 may be associated with one or more of the vehicle 200, for example with the vehicle instrument panel 218, with a key fob (not shown), with a smart key (not shown), and others.

TABLE 1

Rear-mounted light source look-up table.

| # | Transmission (PRNDL) | Ignition | Rear spot switch status | Rear spot intensity | Backup light intensity |
|---|---|---|---|---|---|
| 1 | P | Run | On | On | Off |
| 2 | P | Off | On | On | Off |
| 3 | P | Accessory | On | On | Off |
| 4 | R | Run | On | Off | On |
| 5 | R | Run | Off | Off | On |
| 6 | N | Run | On | Off | Off |
| 7 | N | Run | Off | Off | Off |
| 8 | D | Run | Off | Off | Off |
| 9 | D | Run | On | Off | Off |
| 10 | L | Run | Off | Off | Off |
| 11 | L | Run | On | Off | Off |

As is known, the typical automatic transmission 212 of a vehicle may be placed into at least five settings, e.g. Park (P), Reverse (R), Neutral (N), Drive (D), and Low (L). Other operating settings are known, for example Sport (S) mode. In use, as shown in Table 1, in any setting of the transmission 212 wherein the vehicle can be placed in motion (transmission 212 setting R, N, D, or L), the rear-mounted light sources 204 cannot be operated at the second, higher intensity even if switch 216 is actuated. Only on receiving a signal indicating that the vehicle transmission 212 is set in Park will the BCM 210, on also receiving a signal that switch 216 is in the "on" setting, cause the PWM 208 to supply appropriate voltage to the rear-mounted light sources 204 to provide the second, higher intensity of emitted light. As soon as a user moves the transmission 212 from P to any operating mode (R, N, D, or L), the rear-mounted light sources 204 cease to emit light at the higher intensity. In embodiments, when a user moves the transmission 212 from P to any operating mode, BCM 210 automatically resets switch 216 to an "off" configuration.

In addition, the BCM 210 is operatively connected to the vehicle ignition system 214 as described above. As is known, the typical ignition system 214 of a vehicle has at least three settings: Run (whereby the vehicle engine is running and electrical power is being supplied to various vehicle systems), Off (whereby the vehicle engine is not running and electrical power is not being supplied to various vehicle systems), and Accessory (whereby the vehicle engine is not running but electrical power is being supplied to various vehicle systems). As shown in Table 1, the BCM 210 causes the PWM 208 to supply appropriate voltage to the rear-mounted light sources 204 to provide the second, higher intensity of emitted light on actuation of switch 216 regardless of whether the vehicle ignition system 214 is in the Run, Accessory, or Off configuration.

However, as will be appreciated operation of the rear-mounted light sources 204 at the second, higher intensity requires significant electrical power. This is of limited concern when the ignition system 214 is in Run, since the engine is running and the vehicle alternator 220 is replacing electrical power drained from the vehicle battery 222. However, when the ignition 214 is in the Off or Accessory configurations, electrical power drained from the battery 222 is not replaced. Therefore, in an embodiment the BCM 210 is configured to cause the rear-mounted light sources 204 to fade after a predetermined time period has passed, thus saving battery charge. Such configurations are known, for example whereby vehicle headlights remain on for a predetermined time period after a vehicle engine is shut off to provide illumination for a user, and then fade out.

Thus, by the present disclosure a convenient rear-mounted spot or floodlight is provided, using existing vehicle systems and components. Obvious modifications and variations are possible in light of the above teachings. All such modifications and variations are within the scope of the appended claims when interpreted in accordance with the breadth to which they are fairly, legally and equitably entitled.

What is claimed:

1. A vehicle spot or floodlight system, comprising:
    a vehicle rear-mounted light source that comprises a vehicle backup light array and is configured to emit light at a first intensity and at another intensity that is different from the first intensity;
    an actuator operatively associated with the rear-mounted light source to cause emission of light at the another intensity; and
    a controller configured to selectively allow the actuator to cause the emission at the another intensity only on receiving a signal indicating that a transmission of the vehicle is placed in a park configuration.

2. The system of claim 1, wherein the another intensity illuminates a predefined area disposed behind the vehicle.

3. The system of claim 1, wherein the actuator is a switch associated with one or more of the vehicle, a vehicle key, or a vehicle key fob.

4. The system of claim 1, wherein the controller is one or more of a microprocessor, a vehicle body control module (BCM), and a pulse-width modulator (PWM).

5. The system of claim 1, wherein the controller is further configured to allow the actuator to cause the emission of light at the another intensity only on receiving a signal indicating that an ignition system of the vehicle is placed in a run configuration, an accessory configuration, or an off configuration.

6. The system of claim 5, wherein the controller is further configured to reset the actuator to an off status after a predefined time period on receiving a signal indicating that the ignition system is placed in the accessory configuration or the off configuration.

7. The system of claim 1, wherein the controller is configured to reset the actuator to the off status on receiving a signal indicating that the transmission is placed in a drive configuration.

8. A vehicle including the system of claim 1.

9. A method for providing a rear spot or floodlight for a vehicle, comprising:
    providing a vehicle rear-mounted light source comprising a vehicle backup light array and configured to emit light at a first intensity and at another intensity that is different from the first intensity;
    providing an actuator operatively associated with the rear-mounted light source to cause emission of light at the another intensity; and
    by a controller, selectively allowing the actuator to cause the emission at the another intensity only on receiving a signal indicating that a transmission of the vehicle is placed in a park configuration.

10. The method of claim 9, including configuring the rear-mounted light source whereby the another intensity illuminates a predefined area disposed behind the vehicle.

11. The method of claim 9, including providing the actuator as a switch associated with one or more of the vehicle, a vehicle key, or a vehicle key fob.

12. The method of claim 9, including providing the controller as one or more of a microprocessor, a vehicle body control module (BCM), and a pulse-width modulator (PWM).

13. The method of claim 9, including further configuring the controller to allow the actuator to cause the emission light at the another intensity only on receiving a signal indicating that an ignition system of the vehicle is placed in a run configuration, an accessory configuration, or an off configuration.

14. The method of claim 13, including further configuring the controller to reset the actuator to an off status after a predefined time period on receiving a signal indicating that the ignition system is in the accessory configuration or the off configuration.

15. The method of claim 14, including configuring the controller to reset the actuator to the off status on receiving a signal indicating that the transmission is placed in a drive configuration.

* * * * *